United States Patent [19]

Hungerford

[11] 4,403,055

[45] Sep. 6, 1983

[54] METHOD OF PREPARING A CONCENTRATED ACRYLONITRILE POLYMER SOLUTION

[75] Inventor: Gordon P. Hungerford, Palmyra, N.Y.

[73] Assignee: Mobil Oil Corporation, New York, N.Y.

[21] Appl. No.: 322,785

[22] Filed: Nov. 19, 1981

[51] Int. Cl.$^3$ .............................................. C08K 5/36
[52] U.S. Cl. .................................... 524/173; 264/182
[58] Field of Search ......................... 524/173; 264/182

[56] References Cited

U.S. PATENT DOCUMENTS 2,404,717  7/1946  Houtz ................................... 524/173
3,268,490  8/1966  Sunden et al. ....................... 524/173
3,375,237  3/1968  Baizer .................................. 524/173
3,630,986  12/1971 Mison et al. ......................... 524/173
4,066,731  1/1978  Hungerford ......................... 264/182

Primary Examiner—Joseph L. Schofer
Assistant Examiner—N. Sarofim
Attorney, Agent, or Firm—Michael G. Gilman; James F. Powers, Jr.; James P. O'Sullivan, Sr.

[57] ABSTRACT

Polymer powder is dispersed in a combination of an organic solvent for the powder and sufficient water to prevent dissolution of the powder in the organic solvent. The system is heated and the powder is dissolved in the solvent-water system. Water is thereafter removed and the system concentrated.

2 Claims, No Drawings

METHOD OF PREPARING A CONCENTRATED ACRYLONITRILE POLYMER SOLUTION

BACKGROUND OF THE INVENTION

This invention relates to the preparation of concentrated solutions of acrylonitrile polymer in an organic solvent. More particularly, it relates to the preparation of unusually clear, gel free acrylonitrile polymer solutions capable of being cast into thin films and other structures. The first step in forming an acrylontrile polymer solution is to dissolve it in an appropriate solvent. Depending upon the solvent, there is a tendency for the polymer particles, when they come in contact with the solvent, to adhere to one another, forming agglomerates. If the temperature of the solvent is too high or if the temperature is increased before unwanted agglomerates are broken up, the agglomerates coalesce into partially solvated polymer masses of high viscosity which are difficult and sometimes impossible to dissolve without the use of extraordinary means. Some solvents, for example dimethylsulfoxide (DMSO), are so effective a solvent for PAN that even at room temperature, i.e., approximately 20° C., the powdered particles of the polymer do, in the presence of DMSO, in fact tend to adhere to one another, forming agglomerates and in addition to prematurely increasing the viscosity of the system, form gels and coalesced masses which are difficult to dissolve into the body of the solvent. Attempts to dissolve these unwanted masses by the use of increased temperature have lead to decomposition, with its attendant introduction of undesirable color into the solution, and ultimately into any finished product.

Thus, a practical method for producing high quality concentrated solutions of acrylonitrile polymer in organic solvents has been greatly desired.

In accordance with the present invention, it has been found that clear, agglomerate free acrylonitrile polymer solutions having high solids concentrations have been obtained.

SUMMARY OF THE INVENTION

In accordance with the present invention, acrylonitrile polymer solutions are prepared by mixing (1) a polymer powder; (2) a solvent which, at room temperature, could at least begin to dissolve the polymer; (3) sufficient water, in solution with said solvent, to prevent even the beginning of solution of said polymer at room temperature; and (4) subjecting the system to sufficient temperature to dissolve the system.

More particularly, the present invention involves preparing a concentrated, optically clear, acrylonitrile polymer-dimethylsulfoxide solution which comprises: introducing powdered acrylontrile polymer into a dimethylsulfoxide-water solution, wherein said solution is of such proportions and temperature as to permit at least substantial dispersion of the polymer therein, with at least a substantial absence of solution of the polymer therein; heating this combination under conditions of pressure and temperature so as to effect solution of the polymer therein while simultaneously or sequentially decreasing the water and dimethylsulfoxide content until the water is at least substantially removed, leaving said concentrated polymer-dimethylsulfoxide solution.

It is important that the amount of water in the dimethylsulfoxide-water solution is initially sufficient to prevent even the beginning of solution of the polymer particles in the dimethylsulfoxide. By this technique, it has been discovered that a high concentration of polymer powder can be initially, effectively dispersed, not dissolved, throughout the solvent-water solution, with each polymer particle effectively separated from each other and, with comparatively mild agitation, remain in this state until temperature is increased to ultimately remove water and effect solution of the polymer in the dimethylsulfoxide. After the polymer has become fully and uniformly dissolved in the dimethylsulfoxide, and substantially all water has been removed, and the amount of dimethylsulfoxide has been reduced so as to yield the ultimately desired concentration of polymer and dimethylsulfoxide, the concentrated solution is then ready for its further processing to the ultimate end use of the polymer. The concentrated solution can, for example, be extruded to provide a thin, substantially continuous film. By counter-current washing, the dimethylsulfoxide in the thin film can be replaced by water producing, what is known as, an aquagel of the acrylonitrile polymer. Subsequently, or simultaneously, the film can be machine direction oriented by known techniques, employing transport rollers operating at differential speeds. By a still subsequent step, the film can be oriented in a transverse direction in a tentering apparatus. Finally, the biaxially oriented film can be transported through a drying apparatus to remove the water of the aquagel and yield a crystal clear, polyacrylonitrile film of exceptional quality.

DETAILED DESCRIPTION OF THE INVENTION

A critical feature of the present invention is the provision of a comparatively high concentration of dispersed, finely divided polymer in the material which will ultimately become the solvent therefor. Initially, the solvent is not permitted to have a solvent action on the polymer particles so that they can be uniformly dispersed throughout the system. It has been discovered that beginning at a particular water concentration in a dimethylsulfoxide-water solution, the dimethylsulfoxide-water solution will not dissolve polyacrylonitrile particles at room temperature, i.e., from 20° to 25° C. It has also been discovered that within a particular water content range of dimethylsulfoxide-water solutions, a dramatic decrease in viscosity is seen as compared to the viscosity of combinations of the same percentage of polyacrylonitrile particles in dimethylsulfoxide-water solutions on either side of this comparatively narrow range.

In accordance with the present invention, dimethylsulfoxide, or any other solvent for polyacrylonitrile which at about room temperature tends to initiate dissolution of the particles thereof, is combined with sufficient water to prevent the beginning of the room temperature dissolution. With dimethylsulfoxide, the addition of approximately 6% and above water will prevent this solvation action. Moreover, it has been found that with between about 6% and 10% water in a dimethylsulfoxide-water solution, a fairly concentrated dispersion of PAN particles therein shows an impressively lower viscosity than other dimethyl sulfoxide-water combinations containing the same percentage of polyacrylonitrile polymers.

This was illustrated by monitoring the viscosity of various dimethylsulfoxide-water solutions containing the same amount of polyacrylonitrile powder.

Twelve test samples were prepared and viscosity measurements were obtained. The samples were prepared by combining 75 gms of finely divided polyacrylonitrile in 300 grams of dimethylsulfoxide-water solutions of varying concentration. Thus, the polymer constituted 20% by weight of each composition. The polyacrylonitrile employed had a molecular weight of about 150,000 and a bulk density of about 10 lbs/ft$^3$. The concentration of dimethylsulfoxide in the dimethylsulfoxide-water solutions ranged from 60 to 95%. Using a Brookfield Viscosimeter LVF, with a number 3 spindle, the viscosity of the 12 samples was determined at 23° C. The following table illustrates the change in viscosity of the samples as the percent dimethylsulfoxide increased and the percent water decreased.

TABLE

| SAMPLE NO. | 1 | 2 | 3 | 4 | 5 | 6 | 7 | 8 | 9 | 10 | 11 | 12 |
|---|---|---|---|---|---|---|---|---|---|---|---|---|
| % DMSO | 60 | 65 | 70 | 75 | 80 | 85 | 86 | 88 | 90 | 91 | 94 | 95 |
| Viscosity (Centipoise) | 2700 | 1800 | 1350 | 1450 | 1350 | 1350 | 1350 | 950 | 500 | 150 | 85 | 8800 |

As shown by the values in the foregoing table, a dramatic decrease in viscosity is seen in the systems containing between about 10% water and 6% water. It is not understood why there should be such a significant decrease in viscosity within this range. It is believed that in proportions greater than 95% dimethylsulfoxide there is obviously the beginning of significant dissolution of the polymer in the dimethylsulfoxide. This would explain the high viscosity reading at the 95% DMSO level. It is not, however, understood why at percentages less than about 90% dimethylsulfoxide there is a significant increase in viscosity.

In forming the initial dispersions of the present invention, the dimethylsulfoxide should contain at least about 6% water. Obviously, the system can contain greater percentages of water, for example, up to about 40%, and effective dispersion of the polyacrylonitrile polymer will be obtained without dissolution thereof, however, the disadvantages of increased viscosity and energy loss needed for removal of the water will have to be contended with. Thus, a preferred range is from about 6% to about 10% water in the dimethylsulfoxide-water solution. The ultimate water free concentrated solution of dimethylsulfoxide and polyacrylonitrile should have from about 30 to 50% polyacrylonitrile in the dimethylsulfoxide. By the present invention, an easily workable dispersion can fall within the range of from about 15-25% PAN in the dimethylsulfoxide-water solution. With the present invention, comparatively unsophisticated turbine agitated tanks can be employed in effecting the dispersion of the polyacrylonitrile particles before heating and evaporation of the system is begun.

The acrylonitrile polymers, as contemplated by the present invention, are known materials, as are methods by which such polymers can be produced. U.S. Pat. Nos. 2,585,499 and 2,846,727 can be referred to for details of the preparation of these polymers. In general, suitable acrylonitrile polymers may be prepared by any convenient methods, such as by batch, bulk, solution, emulsion or suspension polymerization. Contemplated polymers include homopolymers of acrylonitrile, as well as copolymers, with such monomers as styrene, methyl styrene, acrylic and alkacrylic ester monomers. It is preferred that the acrylonitrile polymer have an acrylonitrile content of at least about 75% by weight. In order to facilitate the ultimate solution of the polyacrylonitrile powder in the dimethylsulfoxide, once the dispersion facilitating amount of water is removed from the system. This can be accomplished by the use of conventional equipment, such as a hammer mill. The powder can initially be in dry form or alternatively, it can be in its commercially available filter cake form which contains fairly high percentages of water, for example, in the order of about 60% water. When the filter cake-water material is employed, it is to be understood that comparatively anhydrous dimethylsulfoxide should be combined with this material in the appropriate proportions so as to yield a dimethylsulfoxide-water system within the limits referred to above.

The invention will be further described by means of the following examples given by way of illustration and not by way of limitation.

EXAMPLE 1

Into a 300 gallon turbine mixer tank, was placed 732 lbs. of a 90% DMSO, 10% water solution. 150 lbs. of finely divided polyacrylonitrile, amounting to 17% by weight of the total composition was slowly added to the mixed solvent during continuous agitation, at a temperature of about 20° C. After about 90 minutes, the PAN was completely added and uniformly dispersed throughout the system with no evidence of solvation occurring and no evidence of agglomeration or gel sites.

The dispersion was then transferred to an evaporator at atmospheric pressure while agitating and the temperature was increased. The PAN particles began to swell, causing the viscosity of the system to increase dramatically but still within acceptable limits of the system. The temperature was increased to about 88° C. A vacuum was applied and when the pressure reached about 120 Torr the mass began to boil. As water and DMSO were removed, the vapor became richer in DMSO and the pressure was reduced to maintain evaporation, ultimately reaching about 5 Torr at about 80° C. Heating and evaporation was continued until the concentration of the PAN increased to about 32%.

The hot polymer/dimethyl sulfoxide solution was extruded under pressure through a sheeting die which extrudes a thin film of polymer solution onto a cold drum surface. After contacting an aqueous medium, the self-supporting film was stripped from the drum and traversed a counter-current aqueous bath wherein the DMSO was removed and replaced by water, thereby forming an aquagel. The film then was passed through a machine direction orientor comprising a first heated roll maintained at about 75° C. and thereafter a series of orienting rolls which were maintained at a sufficient differential speed to longitudinally stretch the web about 2 to 3 times thereby providing a uniaxially oriented aquagel film. Thereafter, the film was transferred to a tentering unit which transversely oriented the film in a manner well-known to the art. On leaving the tentering unit the film received radiant energy followed by convection heating to remove water therefrom and the film was then cooled to handling temperature.

EXAMPLE 2

Example 1 was attempted to be repeated with dimethyl sulfoxide which was essentially water free. On attempting to disperse the 17% PAN into the dimethyl sulfoxide at room temperature, the system became loaded with agglomerated PAN which could not be dispersed and actually prevented further agitation. The process was terminated as being unsuccessful.

It is to be understood that the process of the present invention can be adapted to a continuous process whereby PAN powder is continuously introduced into a dimethyl sulfoxide-water solution, of an about 90–94% DMSO, 6–10% $H_2O$ combination, preferably 91% DMSO and 9% $H_2O$. As the PAN becomes fully dispersed within the system, it is continuously removed to a solution-evaporator system and onto other processing stations, depending upon the ultimate final form of the PAN.

Variations can, of course, be made without departing from the spirit and scope of the invention.

What is claimed is:

1. The method of preparing biaxially oriented polyacrylonitrile homopolymer film comprising:
    (a) preparing a uniform dispersion of finely divided polyacrylonitrile homopolymer in a solution of dimethylsulfoxide and water wherein the water content of the dimethylsulfoxide-water solution is from about 6–10% by weight;
    (b) heating the dispersion to effect removal of substantially all of the water and uniformly dissolve the polyacrylonitrile in the dimethylsulfoxide;
    (c) decreasing the dimethylsulfoxide content so that the solution can be formed into a self-supporting film;
    (d) forming said solution into a self-supporting film and removing the dimethylsulfoxide from said film by counter-current water washing to form an aquagel film;
    (e) biaxially orienting said aquagel film; and
    (f) removing the water from the biaxially oriented film to form a crystal clear polyacrylonitrile film.

2. The method of claim 1 wherein the uniform dispersion contains about 15–25% by weight of polyacrylonitrile powder.

* * * * *